US006338477B1

(12) United States Patent
Moore

(10) Patent No.: US 6,338,477 B1
(45) Date of Patent: Jan. 15, 2002

(54) DUAL ADJUSTABLE VISE

(75) Inventor: Richard A. Moore, Newport, OR (US)

(73) Assignee: Bitmoore Vise, an Oregon General Partnership, Salem, OR (US)

( * ) Notice: Subject to any disclaimer, the term of this patent is extended or adjusted under 35 U.S.C. 154(b) by 0 days.

(21) Appl. No.: 09/254,628

(22) PCT Filed: Sep. 11, 1997

(86) PCT No.: PCT/US97/16185

§ 371 Date: Mar. 10, 1999

§ 102(e) Date: Mar. 10, 1999

(87) PCT Pub. No.: WO98/10898

PCT Pub. Date: Mar. 19, 1998

Related U.S. Application Data

(60) Provisional application No. 60/026,097, filed on Sep. 13, 1996.

(51) Int. Cl.[7] .................................................. B23Q 3/18

(52) U.S. Cl. .......................... 269/60; 269/251; 269/73; 269/95

(58) Field of Search ................................ 409/219, 220; 82/33 R, 33 A, 40 R, 45; 51/216 R; 269/60, 71, 17, 77, 78, 84, 246, 250, 251, 45, 271, 73

(56) References Cited

U.S. PATENT DOCUMENTS

| | | | | | |
|---|---|---|---|---|---|
| 1,368,085 A | | 2/1921 | Womack | |
| 1,371,617 A | * | 3/1921 | Germanov | 269/95 |
| 3,051,473 A | * | 8/1962 | Juhase | 269/95 |
| 4,013,280 A | * | 3/1977 | Chitayat et al. | 269/71 |
| 4,020,742 A | * | 5/1977 | Raymond | 90/11 |
| 4,822,014 A | | 4/1989 | Buchler | |
| 4,927,126 A | | 5/1990 | Hoffman | |
| 5,243,745 A | * | 9/1993 | Varnau | 29/33 |
| 5,344,264 A | * | 9/1994 | Hevoyvan | 409/235 |
| 5,551,795 A | * | 9/1996 | Engibarov | 403/381 |
| 5,716,043 A | * | 2/1998 | Iwata et al. | 269/73 |
| 5,984,291 A | * | 11/1999 | Iwata et al. | 269/73 |

FOREIGN PATENT DOCUMENTS

| | | |
|---|---|---|
| DE | 596036 | 4/1934 |
| EP | 0709163 | 5/1996 |
| TW | 235539 | 12/1994 |
| TW | 272475 | 3/1996 |

* cited by examiner

*Primary Examiner*—Joseph J. Hail, III
*Assistant Examiner*—Daniel Shanley
(74) *Attorney, Agent, or Firm*—Stoel Rives LLP

(57) ABSTRACT

Stackable dual adjustable vises allow more precise movement of a work piece with the vise in a stationary position. The vises comprise a base vise that is capable of mounting to a work station and has one or more separately adjustable jaws, and a work holding vise that has one or more separately adjustable jaws and is capable of being mounted to the base vise.

12 Claims, 11 Drawing Sheets

DUAL ADJUSTABLE VISE

RELATED APPLICATION

This application claims priority from provisional patent application No. 60/026,097, filed Sep. 13, 1996.

TECHNICAL FIELD

This invention is directed to a vise, and more particularly to a vise unit having plural adjustable features.

BACKGROUND OF THE INVENTION

Many different types of vises are available for holding a work piece while performing a machining operation such as drilling or milling. Typically, these vises have one movable jaw and one fixed jaw. Some machining operations may require the work piece to be adjusted to different positions. In order to adjust the work piece, multiple steps must be taken to remove the work piece and then reposition it in the vise. Some vises have jaws with different removable jaw face plates that may be added or removed to position the work piece. Additionally, shims may be positioned in the vise to adjust the work piece into a different position. In some instances, it may be necessary to disconnect the vise from the work table, reposition it, and reconnect the vise to the work table. Such prior vises are limited to only specific types of machining operations. Additionally, such vises are not only awkward and time consuming to set up which leads to inaccurate positioning of the work piece. Furthermore, such vises are also more expensive because they may require extra jaw faces and shims.

SUMMARY OF THE INVENTION

It is an object of the invention to provide a vise unit that is adapted to be mounted to a work table and that provides quick and accurate positioning of a work piece for high precision operations.

It is a further object of the invention to provide a vise unit that is capable of repositioning the work piece without removing it from the vise.

A further object of the invention is to provide a vise unit that is capable of repositioning the work piece without dismounting the vise from the work table.

Still another object of the invention is to provide a vise unit that allows multiple machining operations to be conveniently performed on the work piece.

Yet a further object of the invention is to provide a vise unit having opposed jaws that are both movable.

Another object of the invention is to provide a vise unit that is capable of adjustment along plural axes.

The preferred vise unit of the present invention has a stationary base vise that adjustably supports a movable work-holding vise. The base vise is capable of being mounted or otherwise secured to a work table. The base vise has two jaws that are both movable and both of which are manipulated by threaded screws along a first axis. The work-holding vise is mounted to the base vise by a lower support adapted to be slidably retained by the jaws of the base vise along a second axis substantially perpendicular to the first axis. The work-holding vise has two jaws that are both movable and manipulated by threaded screws to move along the second axis.

A removable attachment may be connected to the vise unit to move the work-holding vise along the second axis in order to perform an operation, such as milling, on a work piece.

The attachment includes a body that may be connected to the jaws on the base vise and a threaded screw having a free end that engages the work-holding vise to advance it in a controlled manner along the second axis. The attachment can be removably connected from either side of the base vise to advance and retract the vise along the second axis.

In another preferred embodiment, a second work-holding vise is provided having a lower support adapted to be slidably retained by the jaws on the first work-holding vise in a direction substantially parallel to the first axis. The second work-holding vise includes work holding jaws that are both manipulated by threaded screws to move parallel to the first axis.

DETAILED DESCRIPTION OF PREFERRED EMBODIMENT

Figure 1:
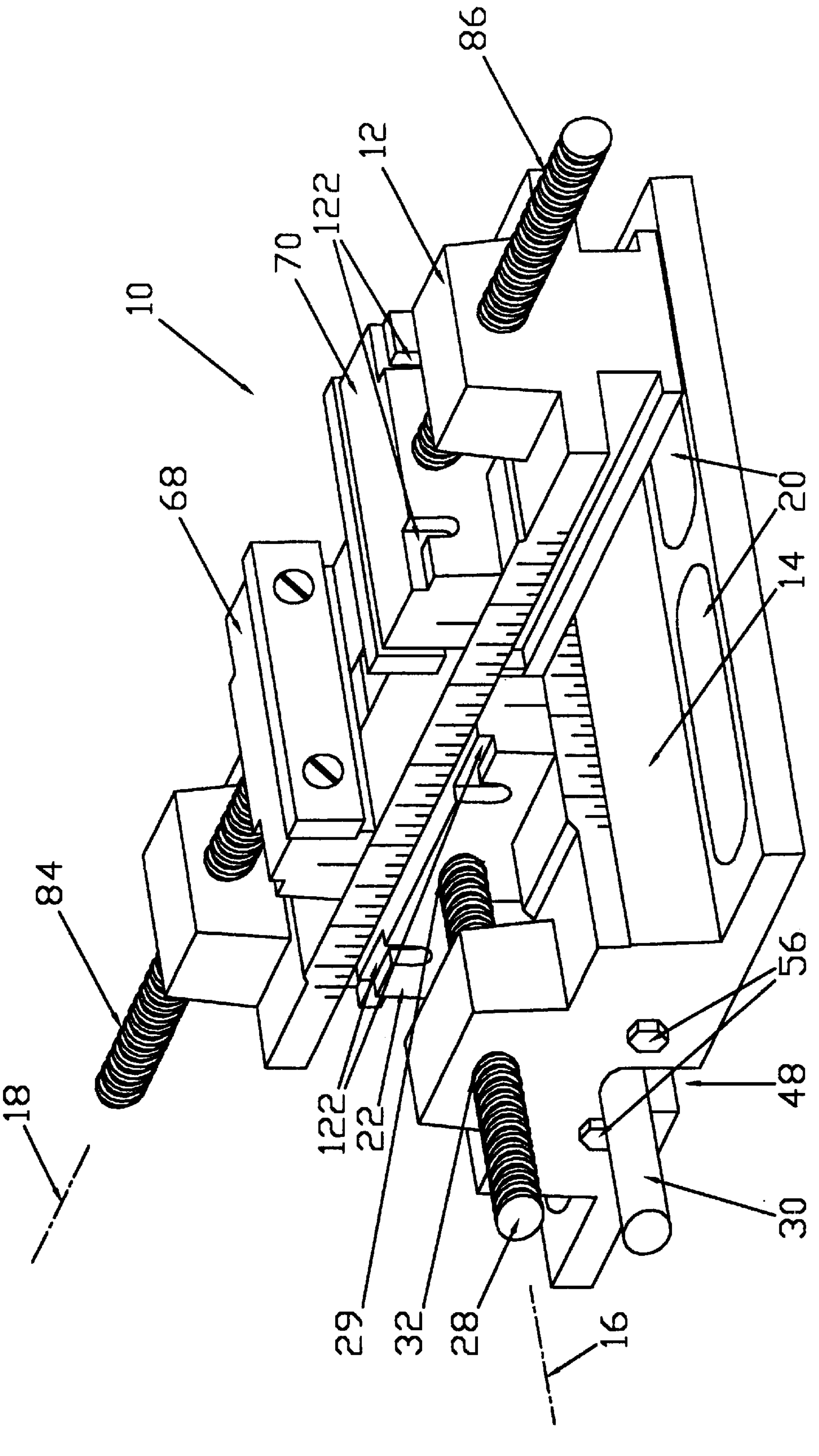
FIG. 1 is an isometric view of a dual adjustable vise according to the present invention.

1 FIG. 1 shows a vise unit 10 in which a work-holding vise 12 is mounted on a base vise 14. The base vise 14 is adapted to be mounted on a work table (not shown) to remain stationary. The work-holding vise 12 is mounted on the base vise 14 so that the work-holding vise 12 can be adjusted or selectively positioned on the base vise 14 along a first longitudinal axis 16. The work-holding vise 12 securely holds a work piece (not shown) which can be adjusted or repositioned along a second longitudinal axis 18 that is substantially perpendicular to the first longitudinal axis 16.

Figure 2:
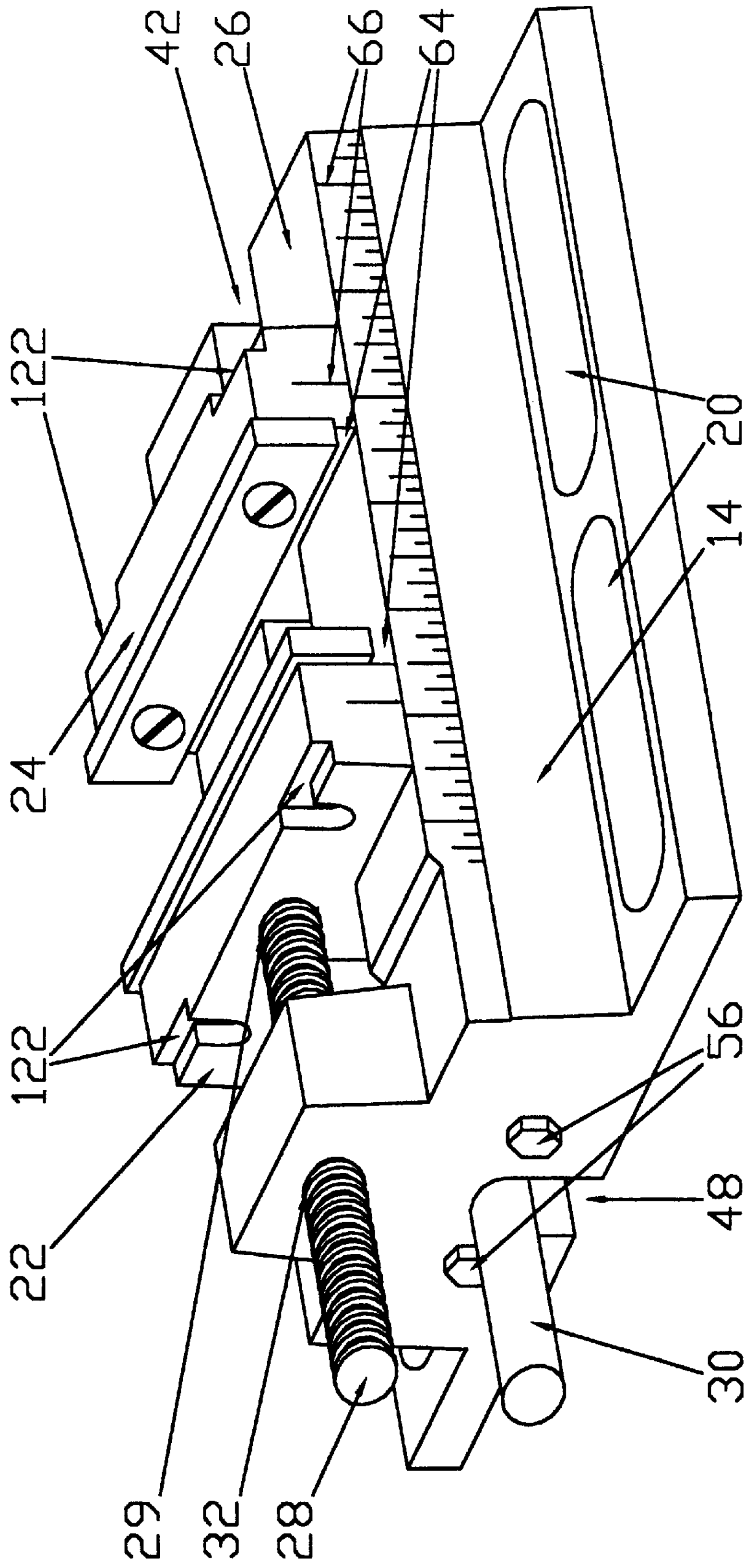
FIG. 2 is an isometric view of the base vise shown in FIG. 1.
Figure 5:
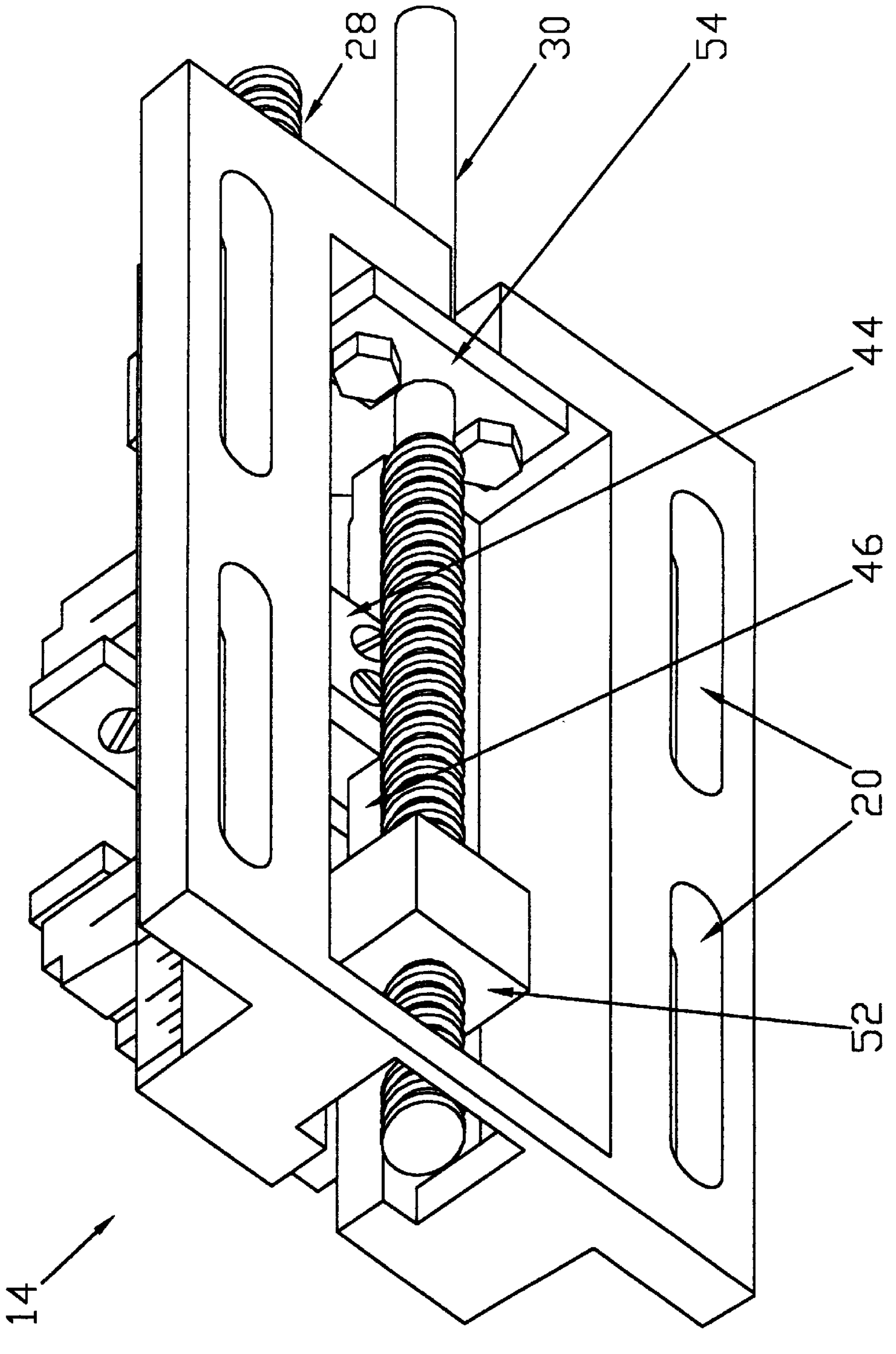
FIG. 5 is an isometric bottom view of the base vise.

The base vise 14 has slots 20 along the outside edges for mounting to the work table by fasteners (not shown). As seen in FIG. 2, the base vise 14 includes a pair of jaws 22, 24 each of which is movable on an upper surface 26 of the base vise 14 and each of which is manipulated by an associated threaded screw 28, 30, respectively, mounted to the base vise 14. For example, the jaw 22 is attached to threaded adjustment screw 28 that extends through a threaded hole 32 in the base vise 14. The adjustment screw 28 is attached to the jaw 22 through opening 29 by any securement desired, such as, for example, by set screws (not shown). As seen most clearly in FIG. 3*a*, jaw 22 has a face plate 36 secured thereto by fasteners 38 and includes a lower guide portion 40 that is guided within a central groove 42 in the base vise 14. The lower guide portion 40 has opposed extensions 44 that ride in grooves 46 (FIG. 5) in base vise 14. Thus, as adjustment screw 28 is rotated it advances and retracts the jaw 22 along the upper surface 26 of base vise 14.

Figure 4B:
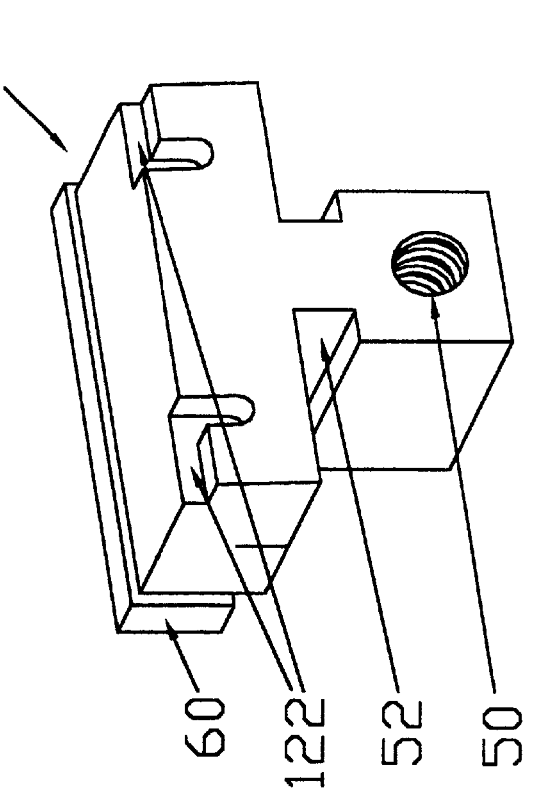
FIGS. 4*a* and 4*b* are isometric front and back views of another of the vise jaws.
Figure 4A:
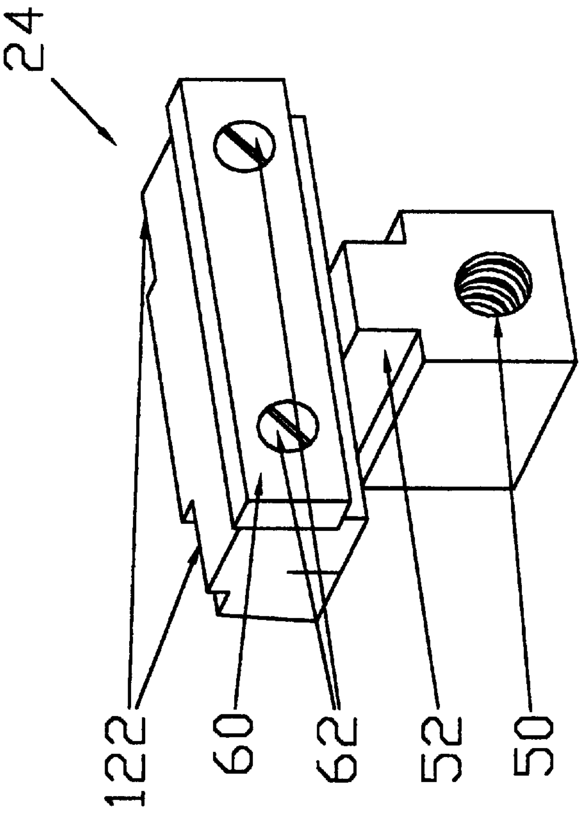

Opposing jaw 24 (FIGS. 4*a* and 4*b*) is attached to a threaded adjustment screw 30 that extends through an opening 48 in base vise 14 and into a threaded hole 50 in a lower guide portion 52 of the jaw 24. The adjustment screw 30 rotates within the opening 48 but is held longitudinally stationary by a retainer plate 54 (FIG. 5) located within a recess in the end of the base vise 14 and secured thereto by fasteners 56. The retainer plate 54 is received in a groove (not shown) in adjustment screw 30 to allow it to rotate but prevent forward or rearward movement. Although the opening 48 is s shown as a notch, it is within the scope of the invention that the opening 48 be a hole. Lower guide portion 52 of the jaw 24 is guided within the central groove 42 in the base vise 14 and rides in the grooves 46 in base vise 14. Jaw 24 also includes a face plate 60 secured thereto by fasteners 62.

The jaws 22, 24 each form a groove 64 (FIG. 2) in order to adjustably mount the work-holding vise 12 as will become apparent down below. Scribe marks 66 may be provided along an edge of the upper surface 26 and on outer sides of jaws 22, 24 in increments of measurement to enable jaws 22, 24 to be precisely adjusted.

In the base vise 14 of this embodiment, each adjustment screw 28, 30 is located at the same end of the base vise 14. However, it should be understood that the adjustment screws 28, 30 could be located at opposite ends of the base vise 14.

Figure 6:
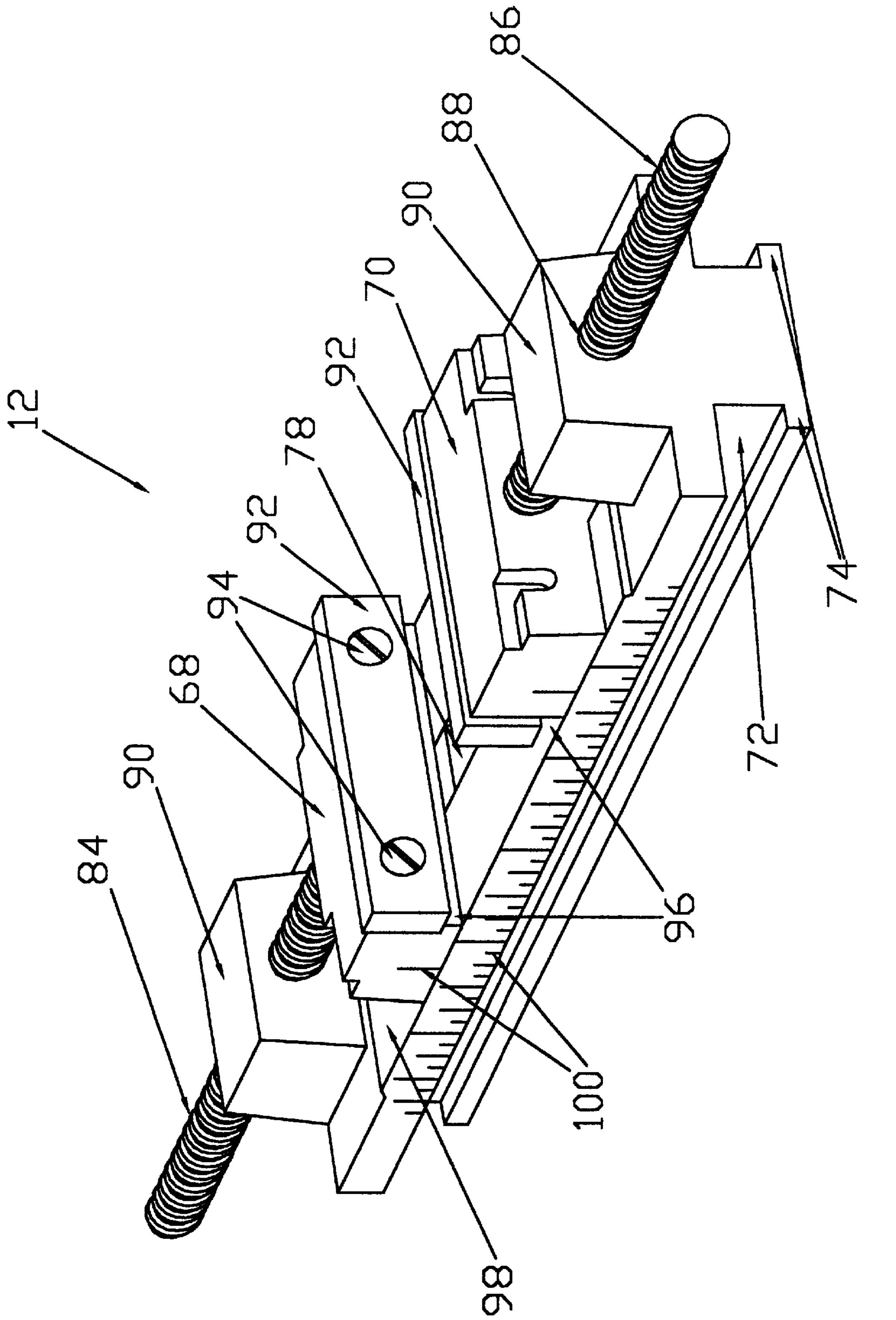
FIG. 6 is an isometric view of the work-holding vise shown in FIG. 1.
Figure 7:
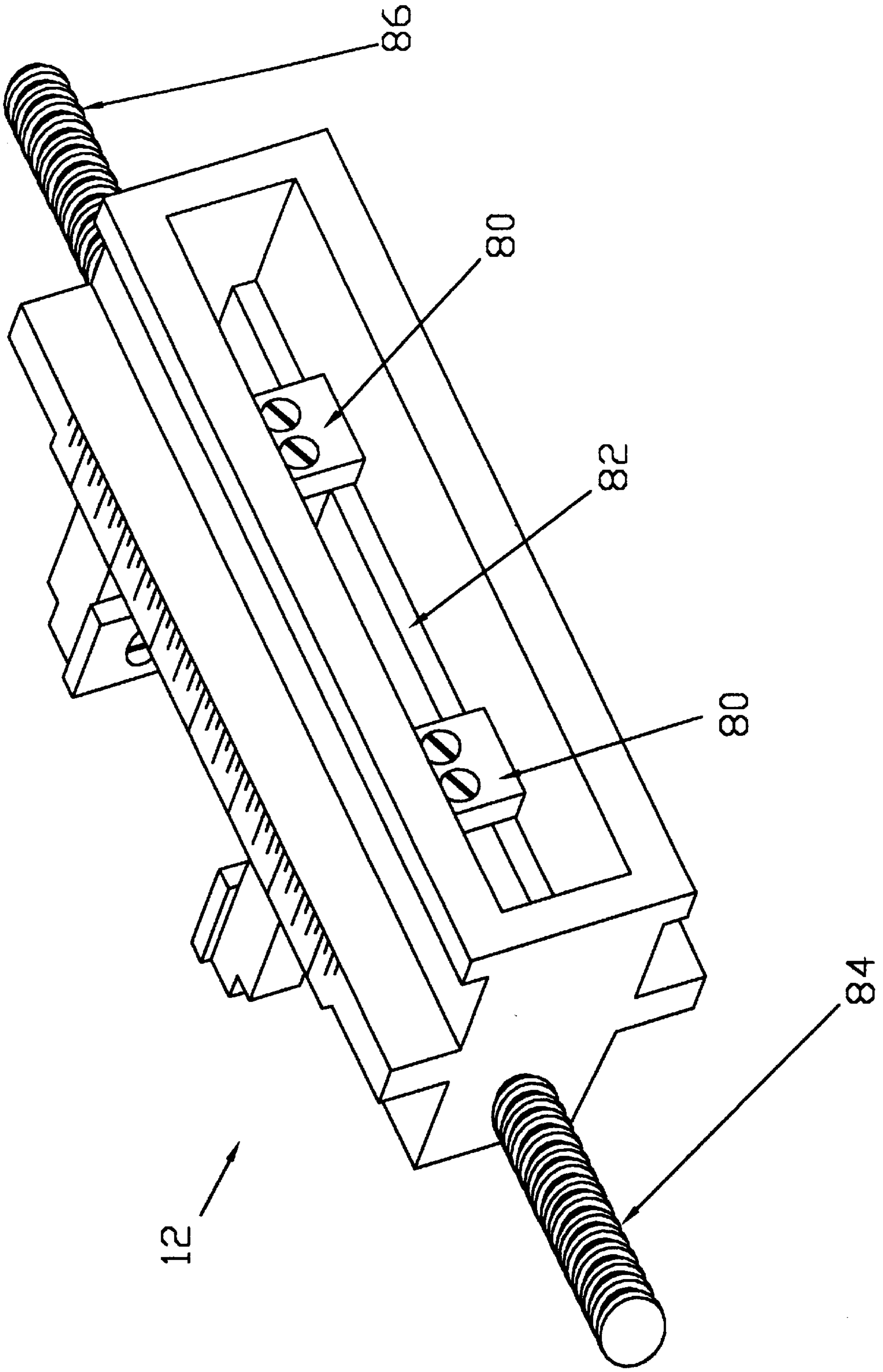
FIG. 7 is an isometric bottom view of the work-holding vise.

Referring to FIGS. 6 and 7, the work-holding vise 12 is shown having two movable jaws 68, 70. The work-holding vise 12 has a lower support 72 having outwardly extending flanges 74 adapted to be slidably received in the grooves 64 in the base vise 14 so that the work-holding vise 12 extends along the second axis 18. The jaws 22, 24 of the base vise 14 are adapted to engage the flanges 74 to securely clamp the work-holding vise 12 in place so that it does not move. Alternatively, the jaws 22, 24 of the base vise 14 may slidably receive the flanges 74 of the work-holding vise 12 to allow it to be adjusted along the second axis 18 and to main a uniform elevation.

Figure 3A:
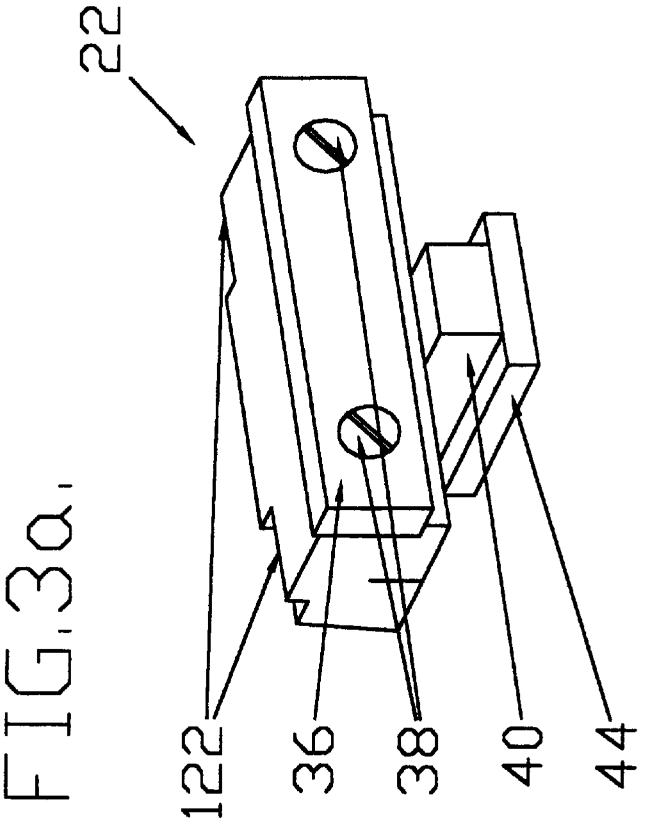
FIGS. 3*a* and 3*b* are isometric front and back views of one of the vise jaws.
Figure 3B:
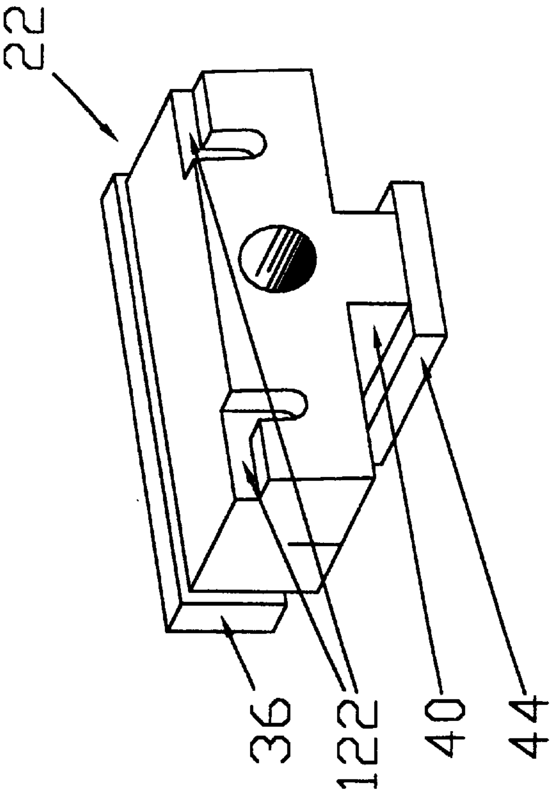

Preferably, each jaw 68, 70 is mounted on the work-holding vise 12 by a lower guide portion 76 that is guided within a central groove 78 in the work-holding vise 12 in a manner similar to jaw 22 in FIGS. 3*a* and 3*b*. Guide flanges 80 ride in grooves 82 in the work-holding vise 12 in a manner similar to jaw 22 in FIGS. 3*a* and 3*b*.

Each jaw 68, 70 is manipulated by a threaded adjustment screw 84, 86, respectively, located at opposite ends of the work-holding vise 12. Each adjustment screw 84, 86 extends through a threaded hole 88 in an upstanding portion 90 of the work-holding vise 12. Preferably, the end of each adjustment screw 84, 86 is secured to its associated jaw 68, 70 through a hole 91 by set screws (not shown) in the same A manner as was discussed with respect to jaw 22 of the base vise 14. Each jaw 68, 70 has a face plate 92 secured thereto by fasteners 94 that forms a groove 96 with a its surface 98 of the work-holding vise 12.

Scribe marks 100 may be provided along an edge of the work holding vise 12 and on the outer sides of jaws 68, 70 in increments of measurement to enable the jaws 68, 70 to be precisely adjusted.

As shown in the figures the work-holding vise 12 may have the adjustment screws 84, 86 located at the same end thereof. Alternatively, it should be understood that the adjustment screws 84, 86 could be located at opposite ends of the work-holding vise 12.

To provide even more adjustment options, the upper surface of either the base vise 14 or the work-holding vise 12, or both, may be a removable plate (not shown) secured to the base vise 14 with fasteners, such as screws, and which may, upon removal of the fasteners, be rotated through any desired angle and re-secured to the base vise 14.

Figure 8:
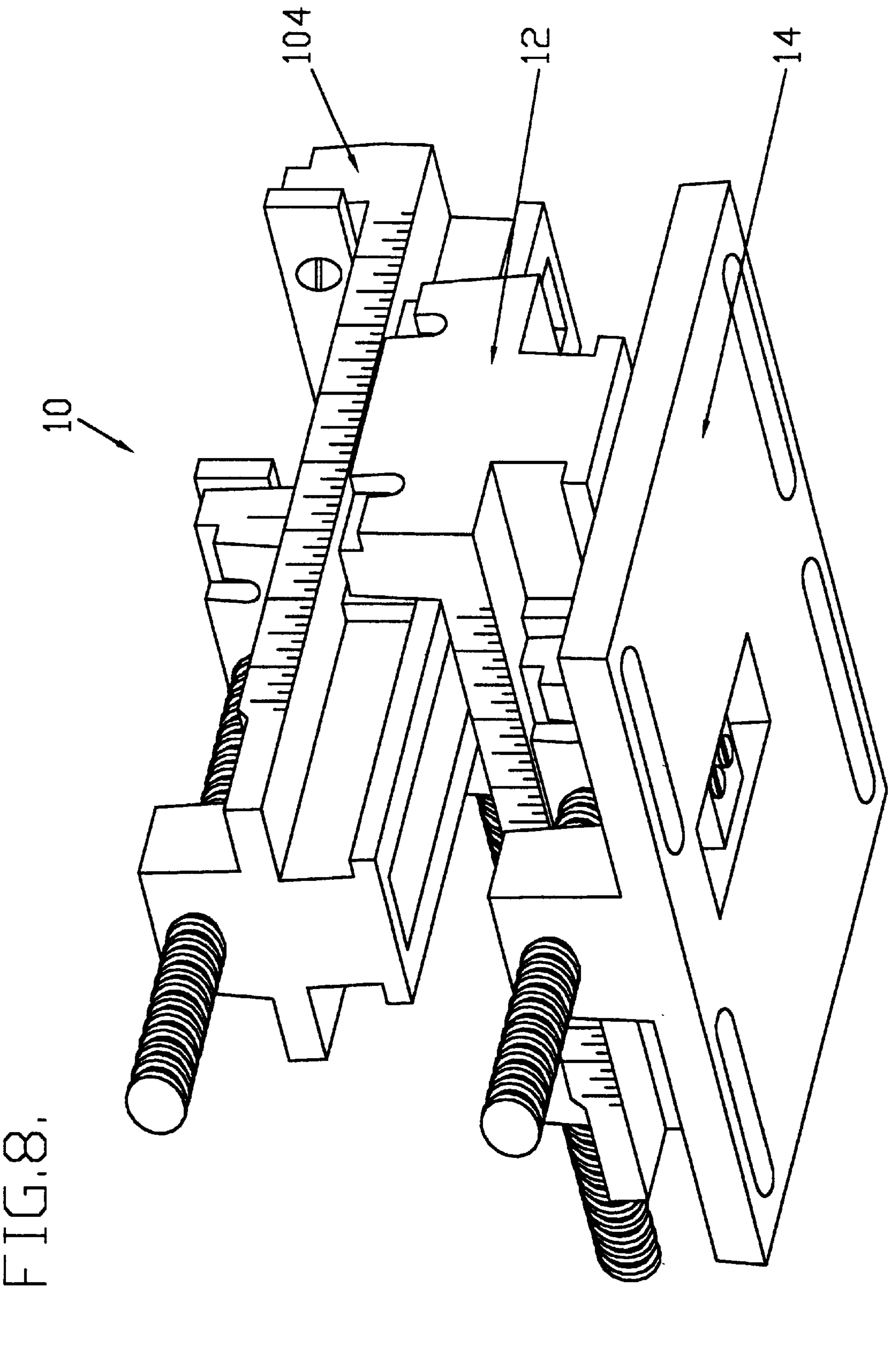
FIG. 8 is an isometric view of the adjustable vise with a second work-holding device.
Figure 9:
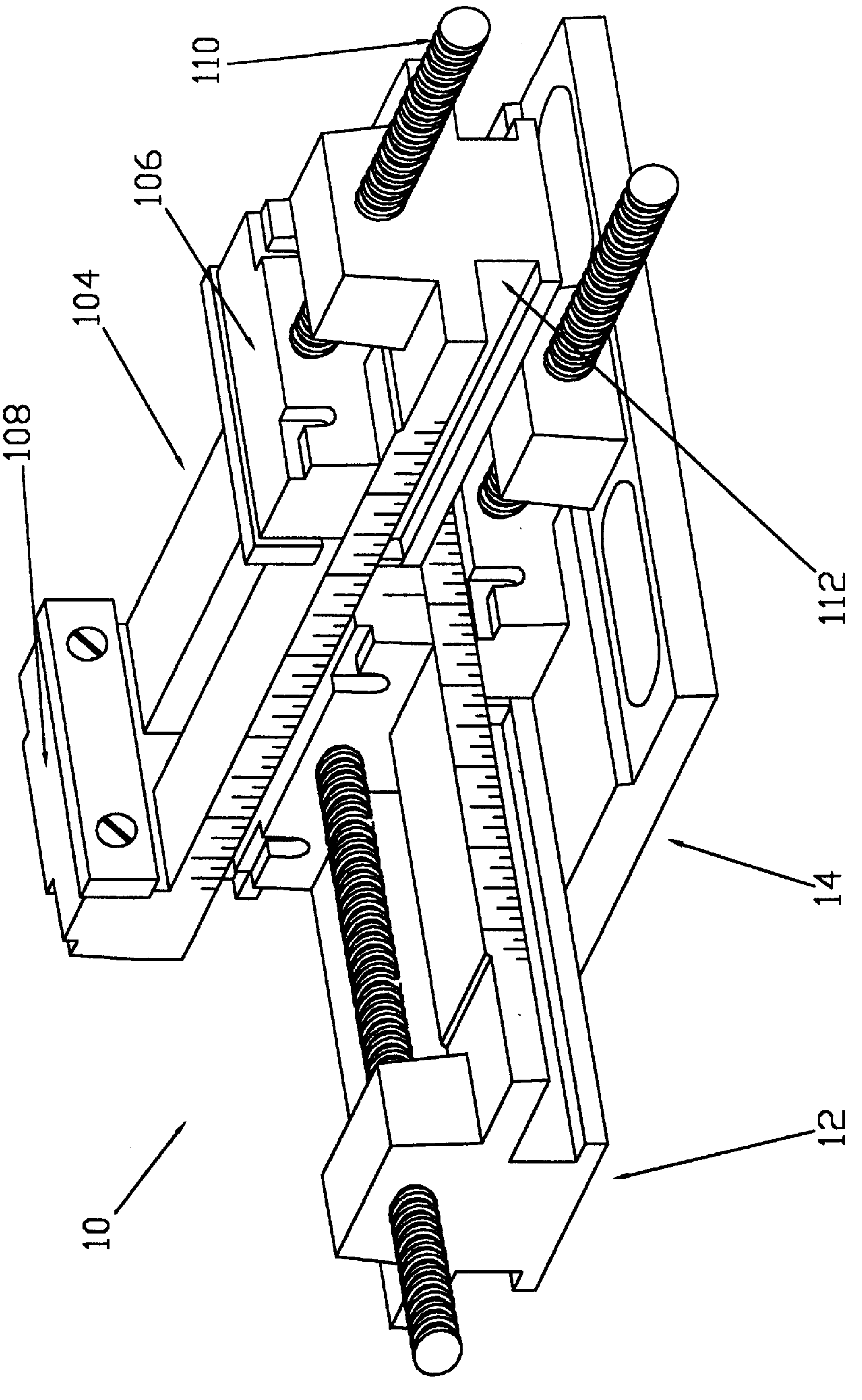
FIG. 9 is an isometric left rear view of the vise shown in FIG. 8.
Figure 10:
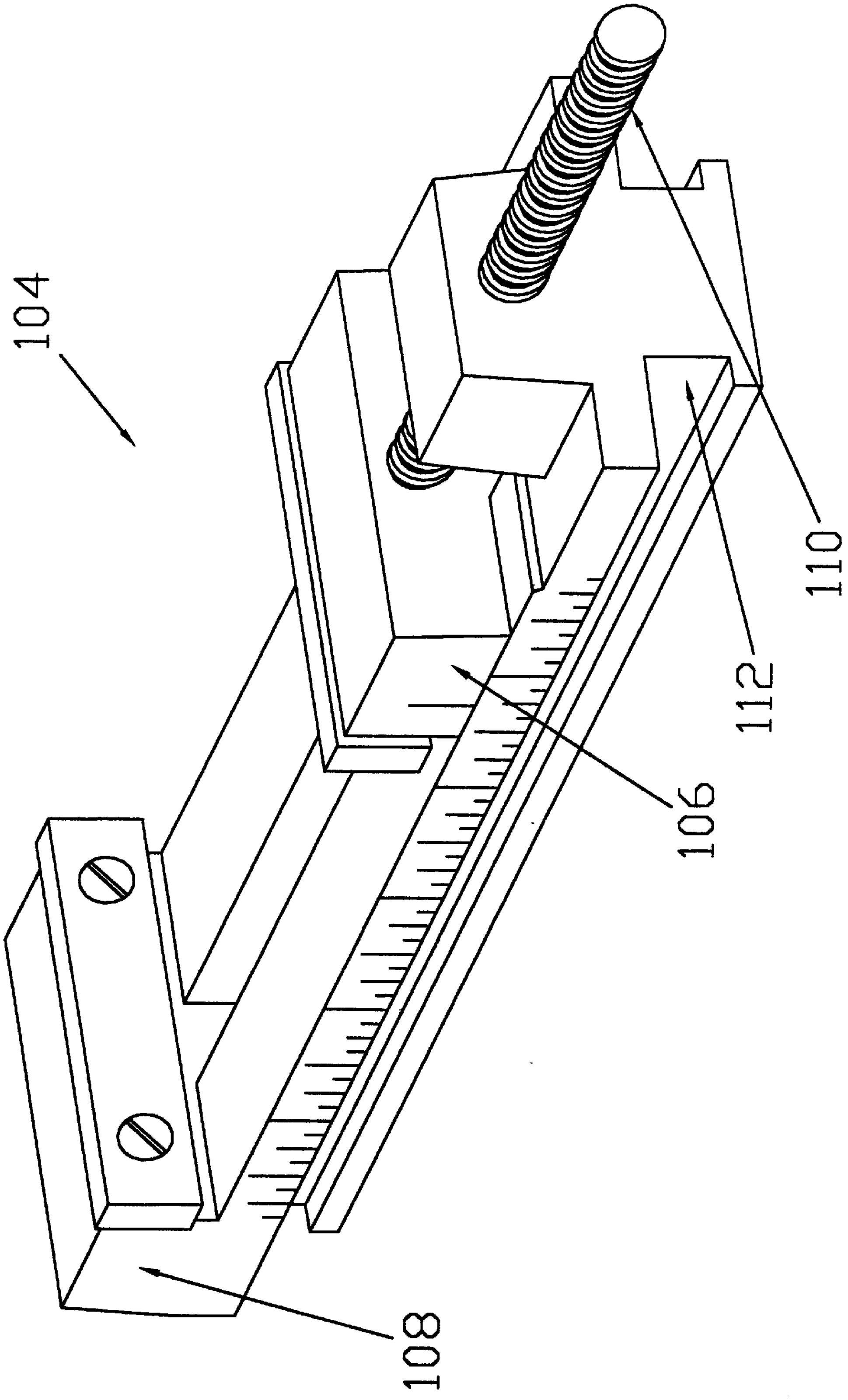
FIG. 10 is an isometric view of the second work-holding vise shown in FIGS. 8 and 9.

Referring now to FIGS. 8–10, the vise unit 10 is shown with a second work-holding vise 104 mounted on the work-holding vise 12. The second work-holding vise 104 can be adjusted along an axis parallel to the first axis 16 and is mounted to the work-holding vise 12 in a manner similar to how the work-holding vise 12 is mounted to the base vise 14.

As seen most clearly in FIG. 10, the base vise 14, the work-holding vise 12 and the second work-holding vise 104 all have one movable jaw and one stationary jaw. For example, the second work-holding vise 104 has one movable jaw 106 and one stationary jaw 108. The movable jaw 106 is adjusted by an adjustment screw 110 in a manner similar to the movable jaws 684 70 of the work-holding vise 12 shown in FIG. 6. The second work-holding vise 104 is mounted in the work-holding vise 12 by a lower guide portion 112 and is guided and held therein in the same manner as previously described with respect to the work-holding vise 12.

Figure 11:
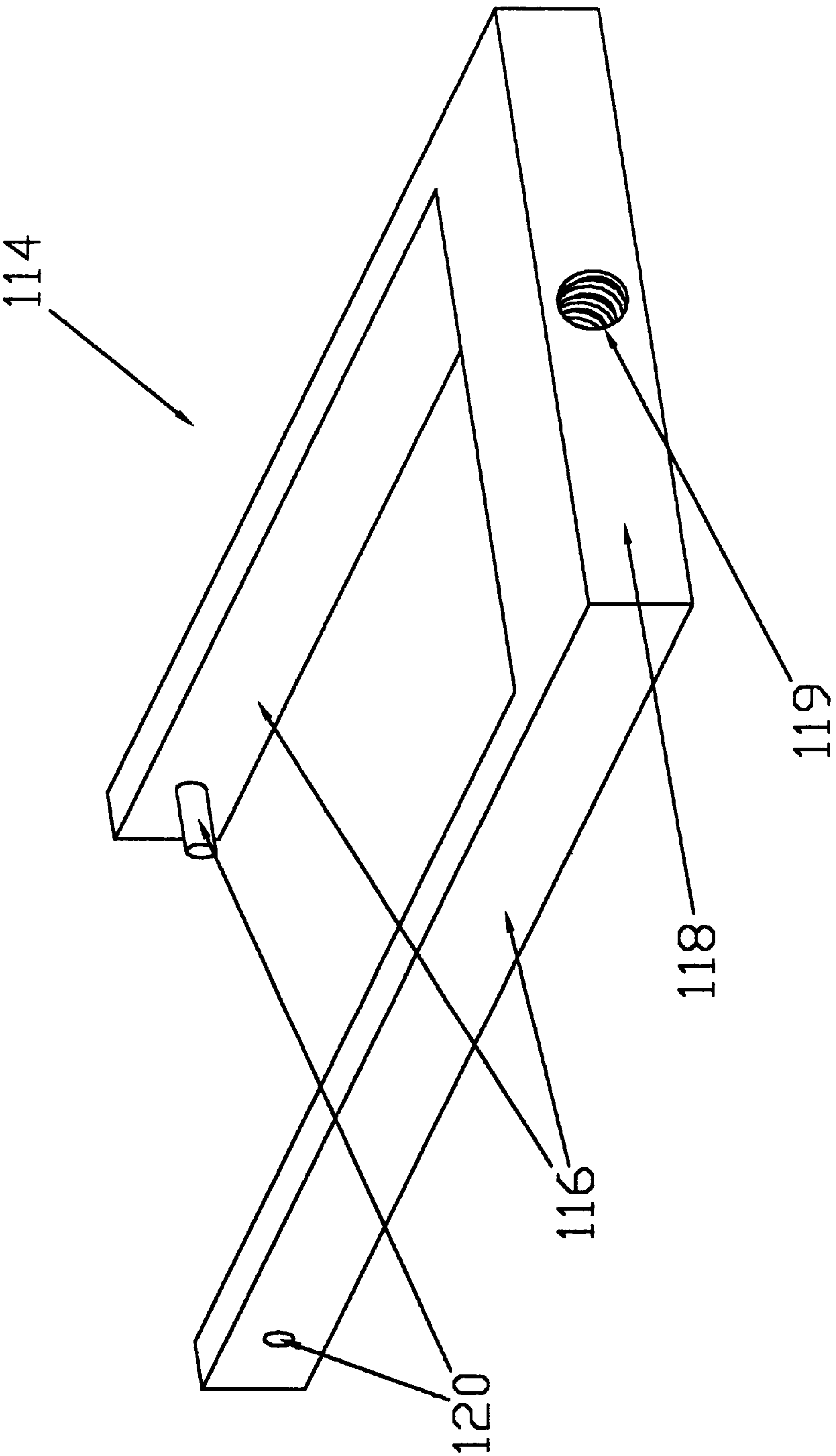
FIG. 11 is an isometric view of a milling attachment.

An attachment 114 seen in FIG. 11 is provided for performing an operation such as milling on a work piece. The attachment 114 is a U-shaped device having parallel arms 116 connected at one end by a base 118. Each arm 116 includes inwardly extending protrusions 120. These protrusions 120 are adapted to engage notches 122 in either the base vise jaws 22, 24 or the work-holding vise jaws 68, 70, respectively. As seen most clearly in FIG. 1, each jaw may have notches at each end. Thus, one protrusion 120 would be inserted in a notch 122 in one jaw while the opposite protrusion 120 would be inserted in similar notch 122 in the opposing jaw. The base 118 has an opening 119 through which a threaded adjustment screw (not shown) extends to engage and move a vise along an axis. For example, if it is desired to move the work-holding device in a controlled manner along the second axis 18, the protrusions 120 of the arms 116 may be inserted into notches 122 in the base vise jaws 22, 24 such that the arms 116 are parallel to the second axis 18. The end of the adjustment screw (not shown) located within the opening 119 abuts the outer end of the work-holding vise 12 so that, as the attachment adjustment screw is rotated the work-holding vise 12 moves in a precise and controlled manner along the second axis 12. The attachment 114 may be connected to either end of the jaw.

In a like manner, the jaws 68, 70 of the work-holding vise 12 may include similar notches so that the attachment can be attached thereto to move the second work-holding vise 104 in a controlled manner along the first axis 16. Having described the invention, it will be apparent to those skilled in the art that it is possible to make slight changes in the design of the preferred embodiment as described herein or to otherwise vary the parts of the device without departing from the scope of spirit of the invention as claimed herein.

What is claimed is:

1. A vise assembly mountable to a work table, comprising:

a support vise including first and second jaws, at least one of which having an associated threaded adjustment screw, the first and second jaws being mounted on the support vise and each of the jaws with which an adjustment screw is associated being operable for movement along a first axis extending along the support vise, a work-holding vise having an upper surface and a lower support and first and second work-holding jaws, the lower support configured to be adjustably retained between The first and second jaws of the support vise, and at least one of the first and second work-holding jaws having an associated threaded adjustment screw, the first and second work holding jaws being mounted on the upper surface of the work-holding vise and each of the work-holding jaws with which an adjustment screw is associated being operable for movement in a direction parallel to a second axis that is substantially perpendicular to the first axis, wherein the work-holding vise may be selectively and precisely moved along the first axis on the support vise by cooperation between the lower support of the work-holding vise and the first and second jaws of Me support vise, and each threaded adjustment screw associated with a work-holding jaw being adjustable along the second axis to locate a work piece or a vise component held between the first and second work-holding jaws.

2. The vise assembly of claim 1 wherein an adjustment screw is associated with each of the first and second jaws, and the adjustment screw associated with the first jaw is connected to one end of the support vise and the adjustment screw associated with the second jaw is connected to an opposite end of the support vise.

3. The vise assembly of claim 1 wherein an adjustment screw is associated with each of the first and second jaws, and the adjustment screw associated with the first jaw and the adjustment screw associated with the second jaw are both connected to the support vise at the same end thereof.

4. The vise assembly of claim 1 wherein the first and second jaws include guide grooves and the first and second work-holding vice includes guides that cooperate with the guide grooves located in the first and second jaws.

5. The vise assembly of claim 1 further comprising an attachment for moving the work-holding vise along a direction parallel to the second axis.

6. The vise assembly of claim 5 wherein the attachment has one end releasably attached to the support vise and an opposite end that supports a threaded advancing screw, the advancing screw having a free end that operatively engages the work-holding vise to move the work-holding vise along the direction parallel to the second axis.

7. The vise assembly of claim 1, further comprising a second work-holding vise having an upper surface and a lower support configured to be adjustably secured between the first and second work-holding jaws, of the work-holding vise and at least one of the second work-holding vise mounted on the upper surface of the second work-holding vise for movement along a third axis that is substantially parallel to the first axis.

8. The vise assembly of claim 7 further comprising a threaded adjustment screw associated with each of the first and second jaws of the second work-holding vise mounted for movement along the third axis to move the each associated one of the first and second jaws, of the second work-holding vise along the third axis.

9. The vise assembly of claim 7 further comprising an attachment for moving the second work-holding vise along a direction parallel to the third axis.

10. The vise assembly of claim 9 wherein the attachment has one end releasably attached to the work-holding vise and an opposite end that supports a threaded advancing screw, the advancing screw having a free end that operatively engages the second work holding vise to move the second work-holding vise along the direction parallel to the third axis.

11. A vise assembly component, comprising:

a vise body member having a length and including an upper surface and a lower support, the lower support downwardly depending from the upper surface, extending along the length of Fe vise body member, and having opposite side surfaces;

first and second opposed jaws, each one of which is adjustable by an associated threaded adjustment screw, and is mounted to an upstanding portion of the upper surface for slidable movement along the upper surface in a direction along the length of the body member; and flange members projecting outwardly from either of the opposite side surfaces of the lower support and extending along the length of the vise body member.

12. The vise assembly component of claim 11 in which the first and second jaws carry respective and first and second face plates each of which having a lower side margin and a length, the first and second face plates positioned in spaced-apart relation to the upper surface of the vise body member to form along the lengths of the face plates grooves between the lower side margins of the face plates and the upper surface of the vise body member.

* * * * *